US007802560B2

(12) United States Patent
Lysinger et al.

(10) Patent No.: US 7,802,560 B2
(45) Date of Patent: Sep. 28, 2010

(54) FUEL INJECTOR MOUNTING ASSEMBLY FOR AN AIRCRAFT ENGINE FUEL DELIVERY SYSTEM

(75) Inventors: Forrest Ross Lysinger, Harrisburg, PA (US); Joseph Eric Parlow, Williamsport, PA (US); Ron Behar, Williamsport, PA (US)

(73) Assignee: Lycoming Engines, a division of Avco Corporation, Williamsport, PA (US)

(*) Notice: Subject to any disclaimer, the term of this patent is extended or adjusted under 35 U.S.C. 154(b) by 216 days.

(21) Appl. No.: 12/104,646

(22) Filed: Apr. 17, 2008

(65) Prior Publication Data

US 2009/0031992 A1 Feb. 5, 2009

Related U.S. Application Data

(60) Provisional application No. 60/926,038, filed on Apr. 24, 2007.

(51) Int. Cl.
*F02M 61/14* (2006.01)
*F02M 63/02* (2006.01)
*F02M 55/00* (2006.01)
*B23P 11/00* (2006.01)

(52) U.S. Cl. .................................... 123/470; 123/458

(58) Field of Classification Search ................. 123/470, 123/456

See application file for complete search history.

(56) References Cited

U.S. PATENT DOCUMENTS 3,835,819 A * 9/1974 Anderson, Jr. ......... 123/406.47
3,930,483 A * 1/1976 Blisko et al. ................ 123/457
4,141,673 A * 2/1979 McCormick ............ 416/170 R
4,286,563 A 9/1981 Fahim et al.
4,286,777 A 9/1981 Brown
4,306,708 A 12/1981 Gassaway et al.

(Continued)

FOREIGN PATENT DOCUMENTS

DE 703312 3/1941

(Continued)

OTHER PUBLICATIONS

International Search Report for PCT/US2008/060568, mailed on Sep. 9, 2008.

(Continued)

*Primary Examiner*—Stephen K Cronin
*Assistant Examiner*—Arnold Castro
(74) *Attorney, Agent, or Firm*—BainwoodHuang

(57) ABSTRACT

A fuel injector mounting assembly is configured to limit or constrain movement of a fuel injector relative to a corresponding cylinder assembly. For example, the fuel injector mounting assembly includes a base that is secured to a cylinder assembly's housing and a fuel conduit. The fuel conduit includes a first fuel conduit portion which operates in conjunction with a cylinder assembly's fuel manifold to capture a fuel injector between the fuel injector mounting assembly and the cylinder assembly's fuel manifold. The fuel conduit also includes a second fuel conduit portion which is secured to a compliant fuel line. With such a configuration of the fuel injector mounting assembly, both ends of the fuel injector are secured to the cylinder assembly to minimize any relative motion in the fuel injector's seals relative to either the cylinder assembly's fuel manifold or to the compliant fuel line.

20 Claims, 9 Drawing Sheets

U.S. PATENT DOCUMENTS

| | | | | |
|---|---|---|---|---|
| 5,044,338 | A | 9/1991 | Shelton | |
| 5,056,489 | A * | 10/1991 | Lorraine | 123/468 |
| 5,070,844 | A | 12/1991 | Daly | |
| 5,261,375 | A * | 11/1993 | Rush et al. | 123/470 |
| 5,357,931 | A * | 10/1994 | Semence | 123/456 |
| 5,445,130 | A * | 8/1995 | Brummer et al. | 123/456 |
| 5,447,139 | A * | 9/1995 | Yonekawa et al. | 123/456 |
| 5,657,733 | A | 8/1997 | Dozier et al. | |
| 5,682,857 | A | 11/1997 | Briggs et al. | |
| 5,715,788 | A | 2/1998 | Tarr et al. | |
| 5,970,953 | A * | 10/1999 | Lorraine et al. | 123/470 |
| 6,178,950 | B1 | 1/2001 | Stockner et al. | |
| 6,213,096 | B1 | 4/2001 | Kato et al. | |
| 6,302,088 | B1 * | 10/2001 | Kato | 123/470 |
| 6,338,333 | B1 * | 1/2002 | Brosseau et al. | 123/456 |
| 6,340,019 | B1 | 1/2002 | Eshleman et al. | |
| 6,408,827 | B1 | 6/2002 | Scollard et al. | |
| 6,513,499 | B2 | 2/2003 | Kehoe | |
| 6,604,512 | B2 * | 8/2003 | Kato | 123/509 |
| 6,863,053 | B2 * | 3/2005 | Suzuki et al. | 123/470 |
| 6,912,996 | B2 | 7/2005 | Kato | |
| 7,004,146 | B1 | 2/2006 | Kato | |
| 7,263,975 | B2 | 9/2007 | Stieler et al. | |
| 2001/0010217 | A1 | 8/2001 | Sato et al. | |
| 2004/0020466 | A1 * | 2/2004 | Kienzler et al. | 123/456 |
| 2004/0050366 | A1 * | 3/2004 | Kato | 123/470 |
| 2006/0201486 | A1 * | 9/2006 | Taguchi et al. | 123/470 |
| 2007/0163545 | A1 | 7/2007 | Beardmore et al. | |

FOREIGN PATENT DOCUMENTS

| | | | |
|---|---|---|---|
| DE | 19953942 | | 7/2000 |
| DE | 102004037787 | | 2/2006 |
| EP | 0752508 | | 8/1996 |
| EP | 0994249 | A | 4/2000 |
| EP | 1150002 | A | 10/2001 |
| EP | 1637729 | A2 | 3/2006 |
| EP | 1892408 | | 2/2008 |
| FR | 2659115 | | 9/1991 |
| FR | 2874060 | A | 2/2006 |

OTHER PUBLICATIONS

Written Opinion for PCT/US2008/060568, mailed on Sep. 9, 2008.

* cited by examiner

FUEL INJECTOR MOUNTING ASSEMBLY FOR AN AIRCRAFT ENGINE FUEL DELIVERY SYSTEM

CROSS REFERENCE TO RELATED APPLICATIONS

This patent application claims the benefit of U.S. Patent Application No. 60/926,038 filed on Apr. 24, 2007, entitled, "FULLY CONSTRAINED FUEL INJECTOR MOUNT FOR COMPLIANT FUEL DELIVERY SYSTEM," the contents and teachings of which are hereby incorporated by reference in their entirety.

BACKGROUND

Conventional piston aircraft engines include multiple cylinder assemblies used to drive a crankshaft. In order to drive the crankshaft, each cylinder assembly requires fuel, such as provided by a fuel pump. For example, as illustrated in FIGS. 1A and 1B, a conventional aircraft engine 10 includes separate cylinder assemblies, collectively referred to as 12, and a fuel distribution assembly 14 that provides fuel to each cylinder assembly 12 from a fuel pump (not shown). As illustrated, the fuel distribution assembly 14 includes a hub 16, connector tubes 18, and fuel nozzles 20 where each connector tube 18 and fuel nozzle 20 connects the hub 16 to a corresponding cylinder assembly 12. As the hub 16 receives fuel from the fuel pump, the hub 16 distributes the fuel to each cylinder assembly 12 through the corresponding connector tube 18 and fuel nozzle 20.

During operation, a spark plug of each cylinder assembly 12 ignites the fuel received from the fuel distribution assembly 14 and causes reciprocation of a piston (not shown) contained within each cylinder assembly 12. As each piston reciprocates, each piston generates a force within the corresponding cylinder assembly 12 sufficient to cause relative motion of the cylinder assemblies 12. For example, as a piston within cylinder assembly 12-1 fires, the loads generated by the piston on the crankshaft causes the cylinder assembly 12-1 to generate a corresponding load on the crankcase 22. This load causes the crankcase 22 to bend or flex such that the operational cylinder assembly 12-1 moves relative to the then non-operational cylinder assemblies 12-2, 12-3.

SUMMARY

Historically, conventional aircraft engines have used mechanical systems to provide direct or indirect fuel distribution to the cylinder assemblies. For example, in the aircraft engine 10 illustrated in FIGS. 1A and 1B, the fuel distribution assembly 14 is a mechanical system that provides fuel directly to each of the cylinder assemblies 12. However, the fuel distribution assembly 14 can suffer from certain deficiencies. For example, the fuel distribution assembly 14 of FIGS. 1A and 1B does not allow purging of fuel contained within the connector tubes 18 when an operator shuts down the engine 10. Accordingly, once the engine 10 is turned off, a portion of the fuel contained within the connector tubes 18 drains into the cylinder assemblies 12 through corresponding nozzles 20. In this post-operational state, the cylinder assemblies 12 absorb heat from the engine components which, in turn, vaporizes the fuel contained in the cylinder assemblies 12 and connector tubes 18. Vaporization of the fuel within the fuel distribution assembly 14 can lead to vapor lock and disrupt the operation of the fuel pump during a subsequent operation of the engine 10.

In comparison to the fuel distribution assembly 14 used in certain aircraft engines, conventional automotive engines utilize electrically actuated fuel injectors to deliver fuel to corresponding cylinder assemblies. For example, a conventional automotive engine includes multiple cylinder assemblies where each cylinder assembly includes a fuel injector having an inboard end coupled to the cylinder assembly and an outboard end coupled to a rigid fuel-delivery rail. Conventional automotive fuel-delivery rails are attached to the engine's cylinder assemblies to support the outboard ends of the fuel injector valves and to supply fuel to each of the fuel injection valves.

The availability of electrically actuated fuel injectors produced for the automotive market has initiated the application of these automotive fuel injectors for piston aircraft engines. The use of electrically actuated fuel injectors as part of an aircraft engine can help to minimize vapor lock to allow unused fuel to be purged from the aircraft engine at the end of the engine's operating cycle. However, conventional automotive fuel-delivery rail designs for electrically actuated fuel injectors are not directly applicable for use with aircraft engines. For example, use of the automotive rigid fuel-delivery rail design in an aircraft engine can interfere with the location of the aircraft engine's cooling baffles and cowlings. Also, as indicated above, the individual cylinder assemblies of the aircraft engine move relative to each other during operation due to the loads generated by the pistons on the crankshaft and differential thermal expansion of the cylinder assemblies. With a rigid fuel rail design in an aircraft engine, these movements can cause fretting wear between the fuel injectors and the fuel rails, thereby reducing fatigue life and decreasing the probability of leak free operation. Additionally, the use of a rigid fuel rail design with fuel injectors in an aircraft engine can create a tolerance stackup for the individual cylinder assemblies relative to the fuel rail, thereby creating alignment issues with respect to the fuel injectors. For example, current rigid fuel-delivery rail designs introduce angular misalignment between each inboard injector port, as carried by each cylinder assembly, and the fuel rail. The angular misalignment produces side loading on both ends of the fuel injector body and causes poor dispersion and atomization of the fuel provided to each cylinder assembly. This irregular and non-atomized fuel delivery, in turn, causes irregular operation of the aircraft engine over a variety of engine speed ranges, reduces the overall fuel efficiency of the engine, and potentially reduces the detonation or knock margin of the engine.

In order to utilize fuel injectors with piston aircraft engines and to solve the deficiencies caused by the conventional rigid fuel-delivery rail designs, manufacturers can utilize flexible connectors, such as compliant tubing, as part of a fuel line to interconnect each of the fuel injectors and to provide fuel from the engine's fuel pump to each of the cylinder assemblies. However, the use of flexible tubing alone does not maintain an adequate seal between each fuel injector and a corresponding cylinder assembly and between each fuel injector and the flexible fuel line. Accordingly, the inadequate seals can lead to fuel leakage.

Embodiments of the present invention relate to a fuel injector mounting assembly for an aircraft engine fuel delivery system. The fuel injector mounting assembly is configured to limit or constrain movement of a fuel injector relative to a corresponding cylinder assembly. For example, the fuel injector mounting assembly includes a base that is secured to a cylinder assembly's housing and a fuel conduit. The fuel conduit includes a first fuel conduit portion which operates in conjunction with a cylinder assembly's fuel manifold to capture a fuel injector between the fuel injector mounting assembly and the cylinder assembly's fuel manifold. The fuel conduit also includes a second fuel conduit portion which is secured to a compliant fuel line. With such a configuration of the fuel injector mounting assembly, both ends of the fuel injector are secured to the cylinder assembly to minimize any relative motion in the fuel injector's seals relative to either the cylinder assembly's fuel manifold or to the compliant fuel line. In one arrangement, the fuel injector mounting assembly controls the angular position of the fuel injector relative to a fuel manifold of the cylinder assembly. For example, the first fuel conduit portion of the fuel injector mounting assembly coaxially aligns a longitudinal axis of the fuel injector with both a longitudinal axis of the first fuel conduit portion and a longitudinal axis defined by the fuel manifold. By controlling the angular position of the fuel injector relative to the fuel manifold of the cylinder assembly, the fuel injector mounting assembly allows for adequate dispersion and atomization of the fuel provided to each cylinder assembly.

In one arrangement, a fuel injector mounting assembly includes a base configured to mount to a cylinder assembly and a fuel conduit supported by the base. The fuel conduit includes a first fuel conduit portion having a first port operable to couple to a fuel source end of a fuel injector and a second fuel conduit portion in fluid communication with the first fuel conduit portion, the second fuel conduit portion having a second port operable to couple to a fuel source. The fuel injector mounting assembly is configured to capture the fuel injector between the first fuel conduit portion and a fuel manifold of the cylinder assembly. In such an arrangement, both ends of the fuel injector are secured to the cylinder assembly to minimize any relative motion in the fuel injector's seals relative to the cylinder assembly's fuel manifold.

In one arrangement, a cylinder assembly includes a cylinder housing, a fuel injector having a fuel source end and a nozzle end opposing the fuel source end, the nozzle end being carried by a fuel manifold of the cylinder housing, and a fuel injector mounting assembly. The fuel injector mounting assembly includes a base supported by the cylinder housing and a fuel conduit supported by the base. The fuel conduit includes a first fuel conduit portion having a first port coupled to the fuel source end of the fuel injector and a second fuel conduit portion in fluid communication with the first fuel conduit portion, the second fuel conduit portion having a second port operable to couple to a fuel source. The fuel injector mounting assembly is configured to capture the fuel injector between the first fuel conduit portion and the fuel manifold of the cylinder housing.

In one arrangement, a method for securing fuel injector to an aircraft engine cylinder assembly includes disposing a nozzle end of a fuel injector within a fuel manifold of a cylinder housing of aircraft cylinder assembly, disposing a fuel source end within a first port of a first fuel conduit portion of a fuel injector mounting assembly, and securing a base of the fuel injector mounting assembly to the cylinder assembly.

In one arrangement, an engine includes an engine body, a network of fuel lines, and multiple cylinder assemblies supported by the engine body and coupled to the network of fuel lines. Each cylinder assembly includes a cylinder housing, fuel injector mounting assembly coupled to the cylinder housing, a cylinder assembly fitting portion coupled to the cylinder housing, a fuel injector supported between the fuel injector mounting assembly and the cylinder assembly fitting portion, fuel injector including a nozzle end adjacent the cylinder assembly fitting portion and a fuel source end adjacent the fuel injector mounting assembly, and a fuel line connector supported by the fuel injector mounting assembly. The fuel line connector is constructed and arranged to couple to a particular fuel line of the network of fuel lines.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Embodiments of the present invention relate to a fuel injector mounting assembly for an aircraft engine fuel delivery system. The fuel injector mounting assembly is configured to limit or constrain movement of a fuel injector relative to a corresponding cylinder assembly. For example, the fuel injector mounting assembly includes a base that is secured to a cylinder assembly's housing and a fuel conduit. The fuel conduit includes a first fuel conduit portion which operates in conjunction with a cylinder assembly's fuel manifold to capture a fuel injector between the fuel injector mounting assembly and the cylinder assembly's fuel manifold. The fuel conduit also includes a second fuel conduit portion which is secured to a compliant fuel line. With such a configuration of the fuel injector mounting assembly, both ends of the fuel injector are secured to the cylinder assembly to minimize any relative motion in the fuel injector's seals relative to either the cylinder assembly's fuel manifold or to the compliant fuel line. In one arrangement, the fuel injector mounting assembly controls the angular position of the fuel injector relative to a fuel manifold of the cylinder assembly. For example, the first fuel conduit portion of the fuel injector mounting assembly coaxially aligns a longitudinal axis of the fuel injector with both a longitudinal axis of the first fuel conduit portion and a longitudinal axis defined by the fuel manifold. By controlling the angular position of the fuel injector relative to the fuel manifold of the cylinder assembly, the fuel injector mounting assembly allows for adequate dispersion and atomization of the fuel provided to each cylinder assembly.

Figure 2:
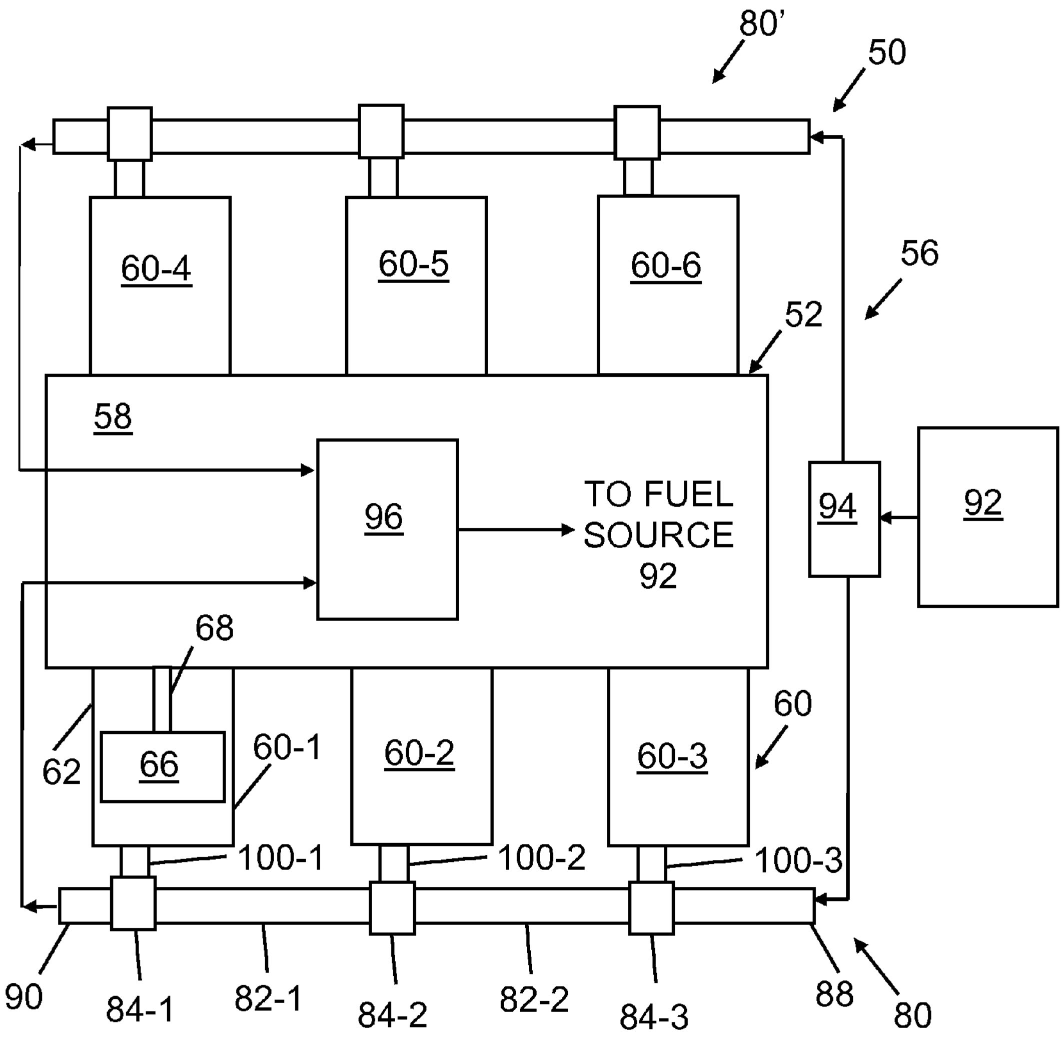
FIG. 2 illustrates a schematic overhead view of an engine having a fuel injector mounting assembly, according to one embodiment of the invention.
Figure 3:
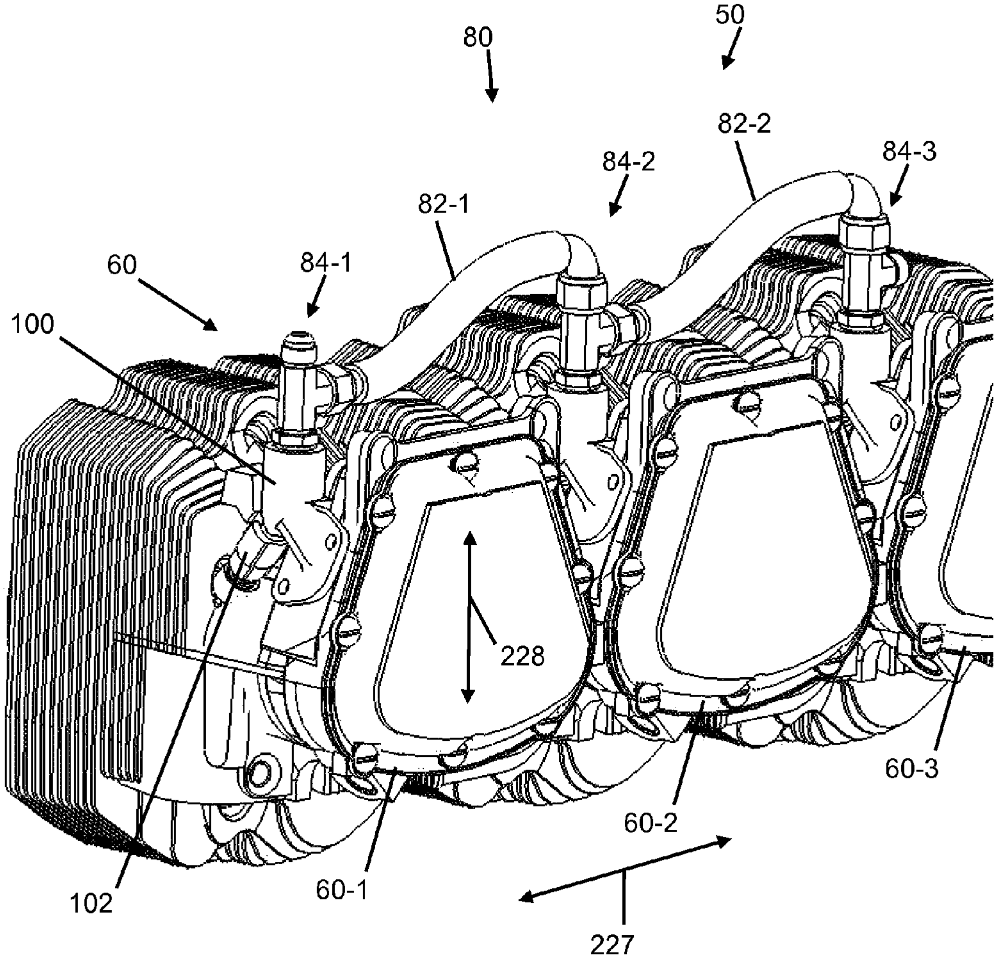
FIG. 3 illustrates a perspective view of a set of cylinder assemblies of the engine of FIG. 2, each cylinder assembly having the fuel injector mounting assembly, according to one embodiment.

FIG. 2 illustrates an example schematic representation of an engine 50, such as an aircraft engine, having a crankcase assembly 52 a set of cylinder assemblies collectively provided as 60, and a fuel delivery system 56. FIG. 3 illustrates a perspective view of a portion of the set of cylinder assemblies of the engine 50 of FIG. 2. Taking FIGS. 2 and 3 collectively, the crankcase assembly 52 includes a crankcase housing 58, a crankshaft (not shown) disposed within the crankcase housing 58, and a set of cylinder assemblies 60 carried by the crankcase housing 50. Each cylinder assembly, 60-1 through 60-6 in this example, of the set of cylinder assemblies 60 includes a cylinder housing 62 secured to the crankcase housing 58 of the engine 50. Each cylinder assembly 60, as indicated in a cut-away view of cylinder assembly 60-1, includes a piston 66 and a connecting rod 68 disposed within the cylinder housing 62. The connecting rod 68 is connected to both the piston 66 and the crankshaft. The piston 66 and connecting rod 68 are configured to reciprocate within the cylinder housing 62 to drive or rotate the crankshaft. While the engine 50 is shown as having six cylinder assemblies 60-1 through 60-6, with three cylinder assemblies 60 being mounted to either side of the crankcase housing 58, the engine 50 can include any number of cylinder assemblies 60.

The fuel delivery system 56 is configured to provide fuel from a fuel source 92 to each of the cylinder assemblies 60. As indicated in FIG. 2, the fuel delivery system 56 includes two separate fuel delivery assemblies or fuel lines 80, 80', a first fuel line 80 configured to carry fuel to cylinder assemblies 60-1 through 60-3 disposed on a first side of the crankcase housing 58 and a second fuel line 80' configured to carry fuel to cylinder assemblies 60-4 through 60-6 disposed on a second, opposing side of the crankcase housing 58. For convenience, the following description will focus on the fuel line 80 associated with the engine 50.

Figure 4:
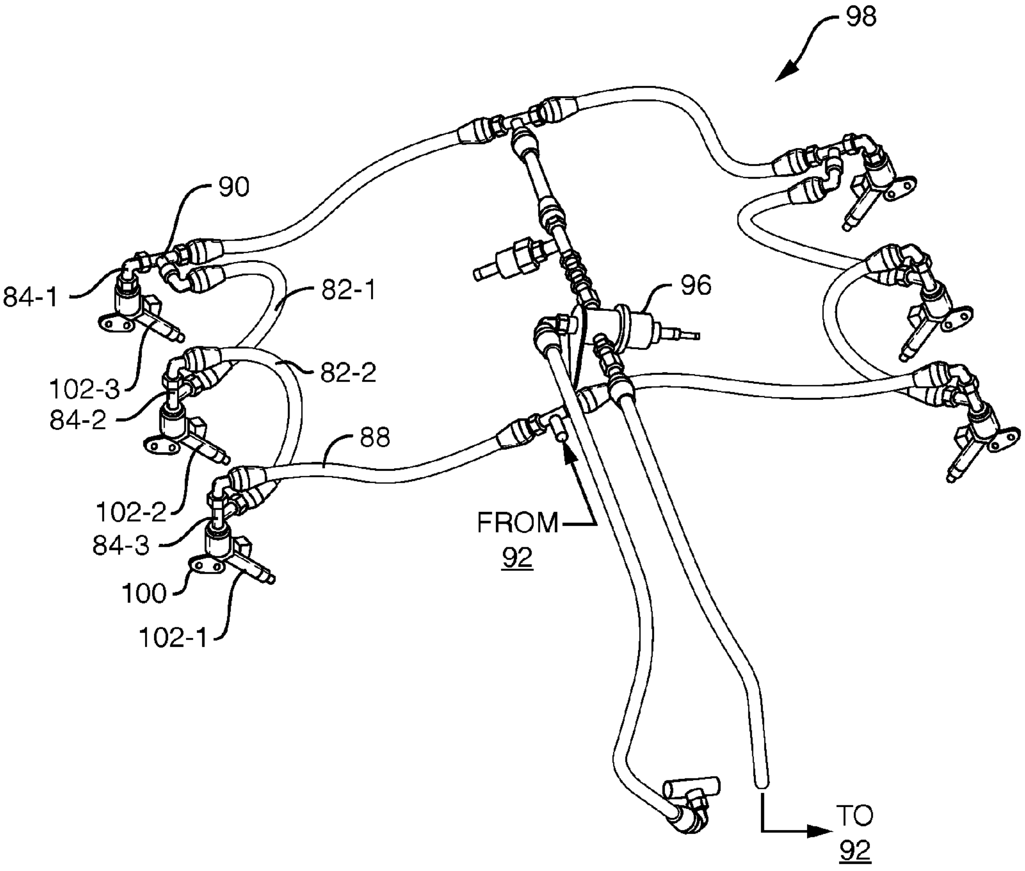
FIG. 4 illustrates a fuel circuit of the engine of FIG. 2.

The fuel line 80 includes a set of fuel line conduits 82, such as first and second fuel line conduits 82-1, 82-2, a fuel inlet 88, and a fuel outlet 90 interconnected by a set of fuel line connectors 84 such as connectors 84-1 through 84-3. Each of the first and second fuel line conduits 82-1, 82-2, fuel inlet 88, and fuel outlet 90 are configured as generally tubular structures configured to carry fuel between the fuel source 92 and a fuel pressure regulator 96. The fuel line conduits 82-1, 82-2 are coupled to the fuel line connectors 84-1 through 84-3 and provide fluid communication between the fluid inlet 88 and the fluid outlet 90. For example, the first fuel line conduit 82-1 is coupled between the first fuel line connector 84-1 and the second fuel line connector 84-2 while the second fuel line conduit 82-2 is coupled between the second fuel line connector 84-2 and the third fuel line connector 84-2. The fuel inlet 88 is disposed in fluid communication between the third fuel line connector 84-2 and a fuel pump 94 while the fuel outlet 90 is disposed in fluid communication with the first fuel line connector 84-1 and the fuel pressure regulator 96. The combination of the fuel lines 80, 80' with the fuel pump 94, fuel pressure regulator 96 and the fuel source 92 forms a fluid circuit 98 as indicated in FIG. 4.

Each fuel line connector 84-1 through 84-3 is disposed in fluid communication with a fuel injector 102, such as low-pressure automotive style fuel injectors, for provision of fuel to each corresponding cylinder assembly 60. For example, as illustrated in FIG. 4 the first fuel line connector 84-1 is disposed in fluid communication with a first fuel injector 102-1, the second fuel line connector 84-2 is disposed in fluid communication with a second fuel injector 102-2, and the third fuel line connector 84-3 is disposed in fluid communication with a third fuel injector 102-3. While the fuel line connectors 84 can be configured as having a variety of shapes, with specific reference to FIG. 4, the fuel line connectors 84 can have either a generally T-shaped configuration, such as fuel line connectors 84-2 and 84-3 or and elbow shaped configuration, such as fuel line connector 84-1.

The fuel line 80 is configured to allow relative motion of the cylinder assemblies 60 during operation while minimizing the application of excessive loads on portions of the fuel line 80. In one arrangement, each of the first and second fuel line conduits 82-1, 82-2 is formed from a compliant material such as a compliant metal material or a compliant rubber or polymeric material. The compliant fuel line conduits 82-1, 82-2 are configured to absorb at least a portion of a load generated by the cylinder assemblies 60 on the fuel line 80 during operation. Typically in use, an operational cylinder assembly 60 causes the crankcase housing 58 to flex or bend that in turn causes each cylinder assembly 60 to move relative to the fuel line conduits 82. For example, with particular reference to the cylinder assembly 60-2 as shown in FIG. 3, as the cylinder assembly 60-2 moves along a substantially vertical direction 227, along a substantially horizontal direction 228, or along some combination of the two directions 227, 228, the cylinder assembly 60-2 moves relative to the fluid conduits 82-1, 82-2. Because the fluid conduits 82-1, 82-2 are formed of a compliant material, the fluid conduits 82-1, 82-2 can flex or move in response to movement of the cylinder assembly 60-2. This flexure helps to absorb a least a portion of the load generated by the cylinder assembly 60-2 on the fuel conduits 82-1, 82-2, thereby minimizing excessive loading on and potential damage to the fuel line 80.

In use, the fuel pump 94 withdraws fuel from a fuel source 92 and delivers the fuel under pressure to the fuel line 80 via the fuel inlet 88. As the fuel flows from the fuel inlet 88 to the fuel outlet 90, each of the fuel line connectors 84-1 through 84-3 provide fuel to a corresponding cylinder assembly 60-1 through 60-3, via corresponding fuel injectors 102. The fuel pressure regulator 96 receives unused fuel received from the fuel outlet 90 and delivers the unused fuel to the fuel source 92.

As indicated above, each fuel line connector 84 is disposed in fluid communication with a corresponding cylinder assembly 60 by way of a fuel injector 102. In one arrangement, in order to maintain an adequate seal between each fuel injector and a corresponding cylinder assembly, thereby allowing the use of fuel injectors as part of a piston aircraft engine 50, the engine includes a fuel injector mounting assembly 100 used to substantially constrain movement of a fuel injector's seals relative to a corresponding cylinder assembly. A description of an arrangement of the fuel injector mounting assembly 100 is provided with respect to FIGS. 5 through 9.

The fuel injector mounting assembly 100 includes a base 110 and a fuel conduit 112 supported by the base 110. The base 110 is configured to mount to a cylinder assembly 60, such as cylinder assembly 60-1 shown in FIG. 5. For example, the base 110 defines fastener openings 114 configured to align with corresponding openings (not shown) defined by the cylinder assembly 60-1. To secure the fuel injector mounting assembly to the cylinder assembly, a manufacturer can dispose fasteners (not shown), such as screws, through the fastener openings 114 and through the cylinder assembly housing openings.

Figure 5:
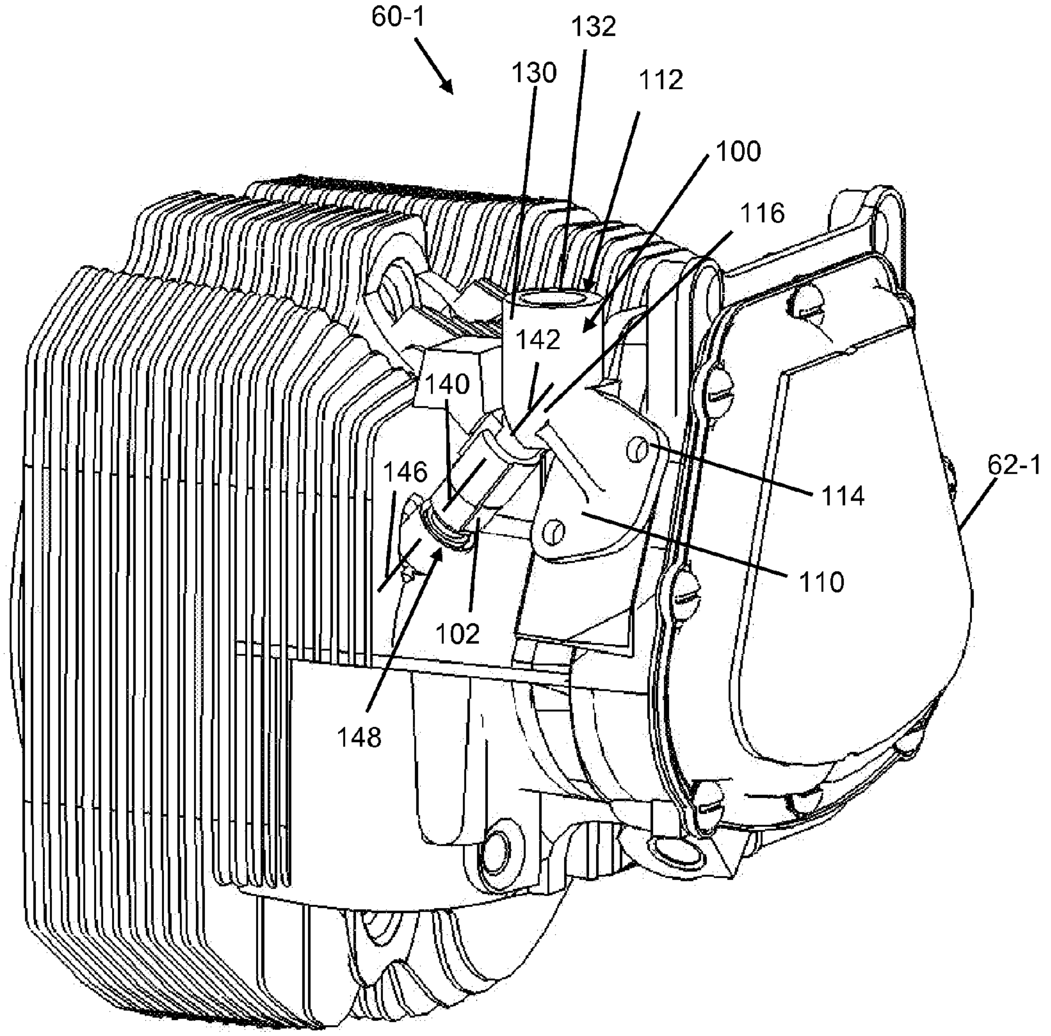
FIG. 5 illustrates a perspective view of a cylinder assembly of the set of cylinder assemblies of FIG. 3.
Figure 6:
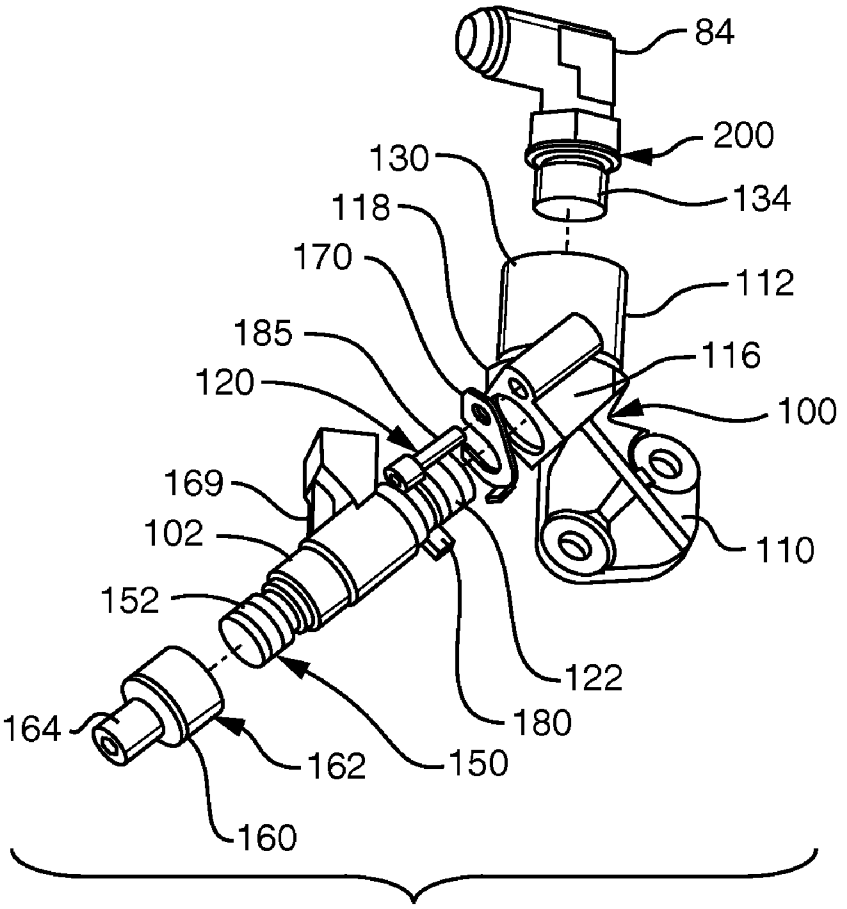
FIG. 6 illustrates an exploded view of an embodiment of a fuel injector assembly of FIG. 3.
Figure 7:
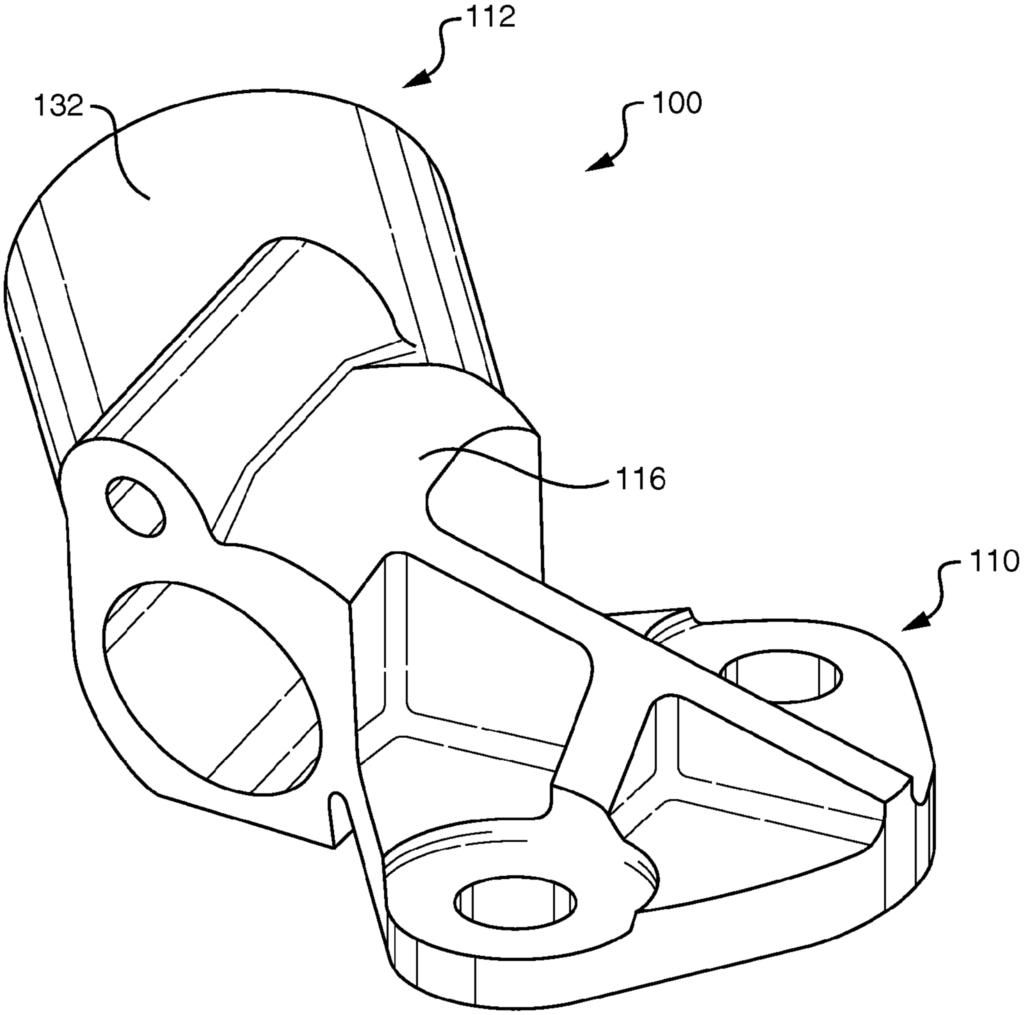
FIG. 7 illustrates the fuel injector mounting assembly of the fuel injector assembly of FIG. 6.

The fuel conduit 112 is supported by the base 110 and is configured to direct fuel from a fuel line connector 84 to a corresponding fuel injector 102. As illustrated in FIGS. 5 and 6, the fuel conduit 112 includes a first fuel conduit portion 116 having a first port 118 and a second fuel conduit portion 130 having a second port 132. The second fuel conduit portion 130 is disposed in fluid communication with the first fuel conduit portion 116 and is operable to couple to a fuel source 92 of the fluid circuit 98. For example, as indicated in FIG. 6, the second port 132 of the second fuel conduit portion 130 is sized to receive a mounting portion 134 of a fuel line connector 84. The first port 118 is configured to receive and maintain a fluid seal with a fuel source end 120 of a fuel injector 102. For example as shown in FIG. 6, the fuel source end 120 of the fuel injector 102 includes a sealing element, such as an O-ring 122. The first port 118 is sized to compress the sealing element 122, thereby generating a seal with the sealing the fuel source end 120 of the fuel injector 102.

In one arrangement, the fuel injector mounting assembly 100 controls the angular position of the fuel injector 102 relative to a fuel manifold of the cylinder assembly. For example, with reference to FIG. 5, the first fuel conduit portion 116 of the fuel injector mounting assembly 100 substantially coaxially aligns a longitudinal axis 140 of the fuel injector 102 with both a longitudinal axis 142 of the first fuel conduit portion 116 and with a longitudinal axis 146 defined by a fuel manifold 148 of the cylinder assembly 60-1. By controlling the angular position of the fuel injector 102 relative to the fuel manifold 148 of the cylinder assembly 60-1, the fuel injector mounting assembly 100 allows for adequate dispersion and atomization of the fuel provided to each cylinder assembly 60 by the corresponding fuel injector 102.

In use, the fuel injector mounting assembly 100 is configured to capture a fuel injector 102 between the first fuel conduit portion 116 and a fuel manifold 148 of a cylinder assembly 60. For example, during assembly an assembler disposes a nozzle end 148 of the fuel injector 102 within a fuel manifold 148 of a cylinder housing of aircraft cylinder assembly. In one arrangement, the fuel manifold 148 is sized such that the interaction between the nozzle end 150 and the fuel manifold 148 compresses a compliant O-ring 152 disposed at the nozzle end 150. This interaction seals the nozzle end 150 with the fuel manifold 148 to minimize or prevent leakage of fuel from the fuel manifold 148. The assembler then disposes the fuel source end 120 of the fuel injector 102 within a first port 118 of the first fuel conduit portion 116 of the fuel injector mounting assembly 100. The assembler then secures the base 110 of the fuel injector mounting assembly 100 to the cylinder assembly. For example, as described above, the manufacturer can utilize fasteners to secure the base to the cylinder assembly housing 62. With such a configuration of the fuel injector mounting assembly 100, both ends 150, 120 of the fuel injector 102 are secured to the cylinder assembly 60 thereby minimizing any relative motion of the fuel injector's seals 122, 152 relative to either the cylinder assembly's fuel manifold 148 or to the compliant fuel line 80. Accordingly, the fuel injector mounting assembly 100 minimizes leakage of fuel from the fuel injector 102 during operation.

Figure 9:
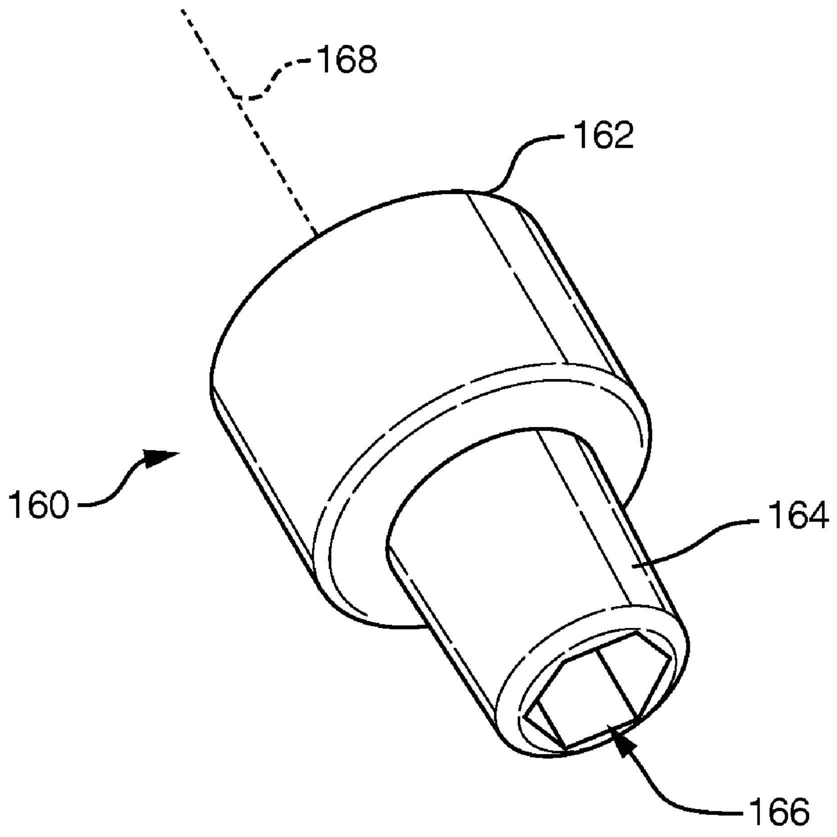
FIG. 9 illustrates a cylinder assembly fitting portion for use with the fuel injector assembly of FIG. 6.

As indicated above, the fuel manifold 148 is sized such that the interaction between the nozzle end 150 and the fuel manifold 148 compresses a compliant O-ring 152 disposed at the nozzle end 150 of the fuel injector 102. In certain cases, however, the port diameter of an engine's fuel manifold 148 can be smaller than outer diameter of the nozzle end 150 of the fuel injector 102. In one arrangement, to allow the use of the fuel injectors with such fuel manifolds, the fuel injector mounting assembly 100 includes a cylinder assembly fitting portion 160, as illustrated in FIGS. 6 and 9. The cylinder assembly fitting portion 160 includes a fuel injector mounting portion 162 and a manifold mounting portion 164. The cylinder assembly fitting portion 160 also defines a bore 166 extending along a longitudinal axis 168 of the cylinder assembly fitting portion 160 to allow the flow of fuel from the fuel injector 102 to the fuel manifold 148.

In use, an assembler inserts the manifold mounting portion 164 within the fuel manifold 148 to create a substantially fluid-tight seal. With such insertion, the longitudinal axis 168 of the cylinder assembly fitting portion 160 is substantially coaxially aligned with the longitudinal axis 142 of the first fuel conduit portion 116 to allow for adequate dispersion and atomization of the fuel by the fuel injector 102. The assembler then inserts the nozzle end 150 of the fuel injector 102 within the fuel injector mounting portion 162 to compress the O-ring 152 disposed at the nozzle end 150 thereby minimizing or preventing leakage of fuel from the cylinder assembly fitting portion 160 during operation.

As described above, each cylinder assembly 60 includes a corresponding fuel injector 102 configured to deliver fuel from a fuel source 92 to the cylinder assembly. In use, and with reference to FIGS. 5 and 6, the fuel injector mounting assembly 100 substantially constrains the fuel injector 102 from moving relative to the seals formed between the nozzle end 150 of the fuel injector 102 and the fuel manifold 148 and between the fuel source end 120 of a fuel injector 102 and the first fuel conduit portion 116. However, in this configuration, the fuel injector 102 can move to its longitudinal axis 140. To minimize such movement, in one arrangement, the fuel injector mounting assembly 100 includes a securing mechanism 170 configured to secure the fuel injector 102 to the base 110.

Figure 8:
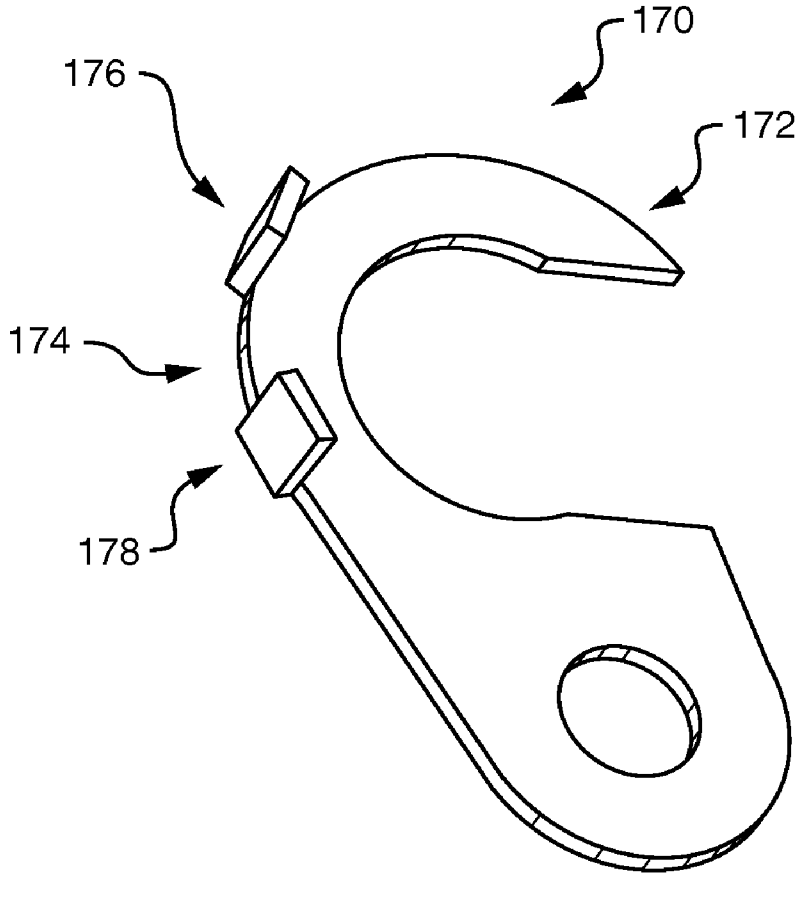
FIG. 8 illustrates a clip of the fuel injector assembly of FIG. 6.

While the securing mechanism 170 can be configured in a variety of ways, in one arrangement and as indicated in FIGS. 6 and 8, the securing mechanism 170 includes a substantially C-shaped body engaging portion 172. For example, the C-shaped body engaging portion 172 is configured as a clip that engages an outer perimeter portion of the fuel injector 102, such as a groove disposed about the outer circumference of the fuel injector 102. In use, prior to inserting the fuel source end 120 of a fuel injector 102 into the first fuel conduit portion 116, an assembler first couples the C-shaped body engaging portion 172 to the outer surface of the fuel injector 102. After the assembler has disposed the fuel source end 120 into the first fuel conduit portion 116, the assembler secures the securing mechanism 170 to the to the fuel injector mounting assembly 100 via a fastener 185, such as a screw. The C-shaped body engaging portion 172 of the securing mechanism 170 secures the fuel injector 102 to the base 110 to limit axial translation of the fuel injector 170 relative to a longitudinal axis 140 of the fuel injector 102.

When disposed within the fuel injector mounting assembly 100, the fuel injector 102 can rotate about its longitudinal axis 140. Such rotation can place a strain on electrical connectors coupled to the fuel injector's electrical coupling port 169. To minimize such rotation, in one arrangement, the fuel injector mounting assembly 100 includes a securing mechanism 170 configured to limit rotation of the fuel injector 102 about its longitudinal axis 140. For example, as indicated in FIGS. 6 and 8, the securing mechanism 170 includes a tab engaging portion 174. The tab engaging portion 174, in one arrangement, includes a first tooth 176 spaced apart from a second tooth 178. In use, prior to inserting the fuel source end 120 of a fuel injector 102 into the first fuel conduit portion 116, an assembler first aligns the teeth 176, 178 on either side of the fuel injector tab 180. With such alignment, the teeth 176, 178 capture the tab 180 of the fuel injector 102 there between. Accordingly, the teeth 176, 178 minimize rotation of the fuel injector 102 about its longitudinal axis 140. After the assembler has disposed the fuel source end 120 into the first fuel conduit portion 116, the assembler secures the securing mechanism 170 to the fuel injector mounting assembly 100 via a fastener 185, such as a screw.

While various embodiments of the invention have been particularly shown and described, it will be understood by those skilled in the art that various changes in form and details may be made therein without departing from the spirit and scope of the invention as defined by the appended claims.

Figure 1A:
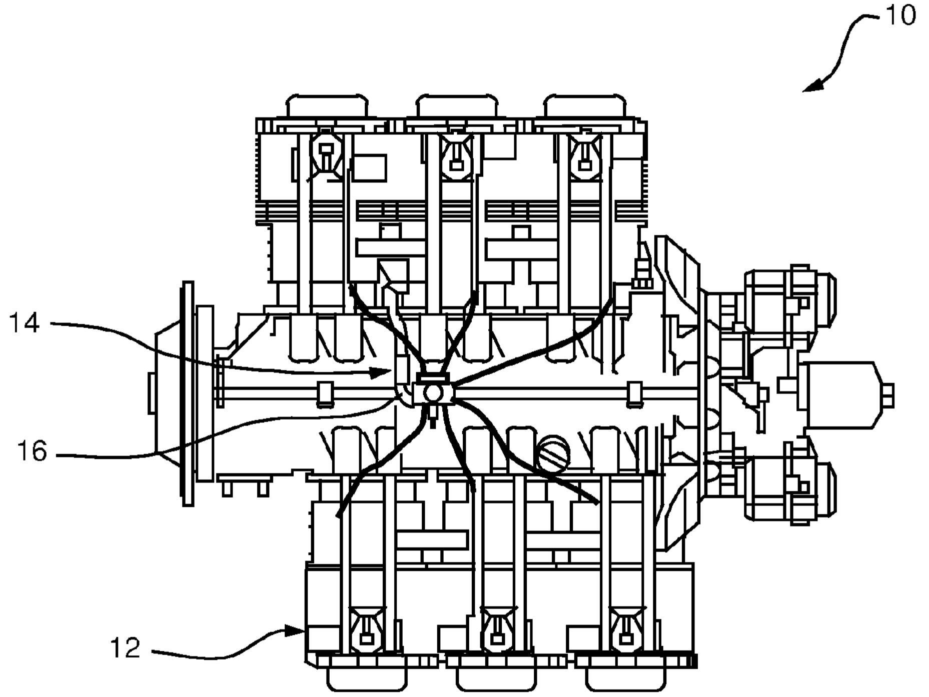
FIG. 1A (PRIOR ART)
FIG. 1A illustrates a top view of a representation of a prior art aircraft engine.
Figure 1B:
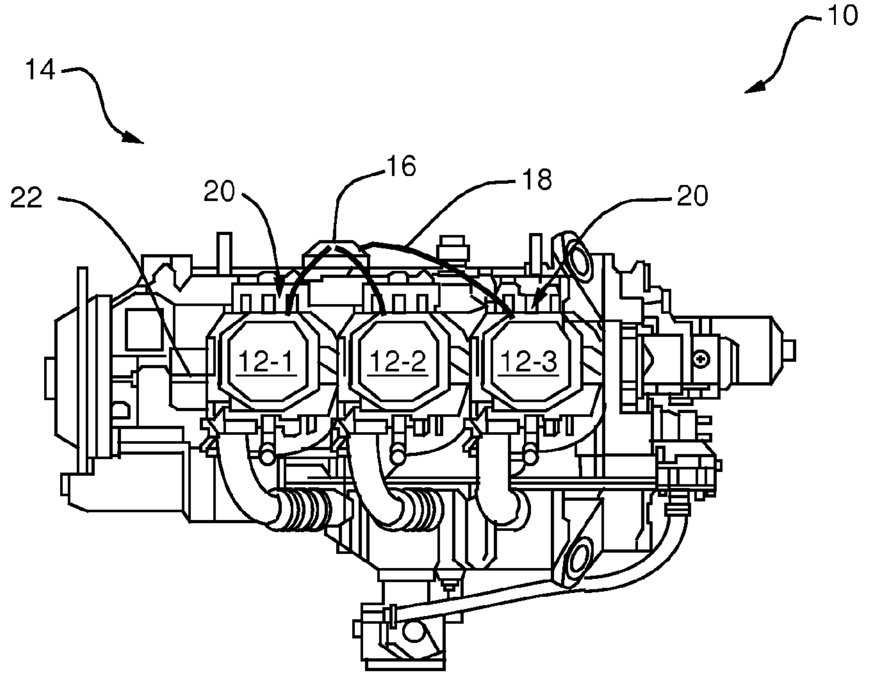
FIG. 1B (PRIOR ART)
FIG. 1B illustrates a side view of the prior aircraft art engine of FIG. 1A.

For example, as indicated above, the fuel injectors 102 and the fuel injector mounting assemblies 100 are utilized with an engine 50 having compliant fuel lines 80, 80'. Such indication is by way of example only. In one arrangement, the fuel injectors 102 and the fuel injector mounting assemblies 100 can be used with an engine having a fuel distribution assembly that includes a hub, connector tubes, and fuel nozzles, such as shown and described with respect to FIGS. 1A and 1B.

As indicated above, the each of the first and second fuel line conduits 82-1, 82-2 is formed from a compliant material such as a rubber material to allow relative motion of the cylinder assemblies 60 during operation while minimizing the application of excessive loads on portions of the fuel line 80. Such description is by way of example only. In one arrangement, one or more of the fuel line connectors 84 are configured to allow relative motion of the cylinder assemblies 60 during operation. For example, as indicated in FIG. 6, each fuel line connector includes a swivel apparatus 200 that allows rotational motion of the fuel line connectors relative to the corresponding the second fuel conduit portions. Accordingly, during operation as a cylinder assembly such as cylinder assembly 60-2 moves relative to the fluid conduits 82-1, 82-2, the fuel line connectors 84 can rotate relative to the corresponding second fuel conduit portions of the fuel injector mounting assemblies 100, thereby minimizing application of excessive loads on portions of the fuel line 80.

As indicated above, in one arrangement, each of the first and second fuel line conduits 82-1, 82-2 is formed from a compliant material such as a compliant metal material or a compliant rubber or polymeric material. In one arrangement, the fuel inlet 88 and fuel outlet 90 are also formed from a compliant material such as a compliant metal material or a compliant rubber or polymeric material.

What is claimed is:

1. A fuel injector mounting assembly, comprising:

a base configured to mount to a cylinder assembly;

a fuel conduit supported by the base, the fuel conduit having (i) a first fuel conduit portion having a first port operable to couple to a fuel source end of a fuel injector and (ii) a second fuel conduit portion in fluid communication with the first fuel conduit portion, the second fuel conduit portion having a second port operable to couple to a fuel source, the fuel injector mounting assembly being configured to capture the fuel injector between the first fuel conduit portion and a fuel manifold of the cylinder assembly; and a securing mechanism supported by the base, the securing mechanism having:

a substantially C-shaped body engaging portion configured to be disposed about an outer perimeter of the fuel injector and configured to secure the fuel injector to the base to limit axial translation of the fuel injector relative to a longitudinal axis of the fuel injector, and a tab engaging portion configured to capture a tab of a fuel injector therebetween to limit rotation of the fuel injector about a longitudinal axis of the fuel injector.

2. The fuel injector mounting assembly of claim 1, wherein a longitudinal axis of the first fuel conduit portion is configured to substantially align with a longitudinal axis defined by the fuel manifold of the cylinder assembly.

3. The fuel injector mounting assembly of claim 1, comprising a cylinder assembly fitting portion configured to be disposed in fluid communication with the fuel manifold of the cylinder assembly.

4. The fuel injector mounting assembly of claim 1, comprising a fuel line connector carried by the second fuel conduit portion, the fuel line connector configured to couple to the fuel source via a fuel line.

5. The fuel injector mounting assembly of claim 1, wherein the tab engaging portion comprises a first tooth and a second tooth spaced apart from the first tooth, the tab engaging portion configured to capture a tab extending from a body of the fuel injector between the first tooth and the second tooth to limit rotation of the fuel injector about the longitudinal axis of the fuel injector.

6. The fuel injector mounting assembly of claim 4, wherein the fuel line connector carried by the second fuel conduit portion is configured in one of a substantially T-shaped configuration and a substantially elbow shaped configuration.

7. The fuel injector mounting assembly of claim 4, wherein the fuel line connector carried by the second fuel conduit portion comprises a compliant fuel line conduit coupled thereto, the compliant fuel line conduit configured to absorb at lease a portion of a load generated by the cylinder assembly on the fuel line during operation.

8. A cylinder assembly, comprising:

a cylinder housing;

a fuel injector having a fuel source end and a nozzle end opposing the fuel source end, the nozzle end carried by a fuel manifold of the cylinder housing; and a fuel injector mounting assembly, having:

a base supported by the cylinder housing, a fuel conduit supported by the base, the fuel conduit having (i) a first fuel conduit portion having a first port coupled to the fuel source end of the fuel injector and (ii) a second fuel conduit portion in fluid communication with the first fuel conduit portion, the second fuel conduit portion having a second port operable to couple to a fuel source, the fuel injector mounting assembly being configured to capture the fuel injector between the first fuel conduit portion and the fuel manifold of the cylinder housing, and a securing mechanism supported by the base, the securing mechanism having:

a substantially C-shaped body engaging portion configured to be disposed about an outer perimeter of the fuel injector and configured to secure the fuel injector to the base to limit axial translation of the fuel injector relative to a longitudinal axis of the fuel injector; and a tab engaging portion configured to capture a tab of a fuel injector therebetween to limit rotation of the fuel injector about a longitudinal axis of the fuel injector.

9. The cylinder assembly of claim 8, wherein a longitudinal axis of the first fuel conduit portion is substantially coaxially aligned with a longitudinal axis of the fuel manifold of the cylinder assembly.

10. The cylinder assembly of claim 8, comprising a cylinder assembly fitting portion disposed in fluid communication with the fuel manifold of the cylinder assembly, the nozzle end of the fuel injector disposed in fluid communication with the cylinder assembly fitting portion.

11. The cylinder assembly of claim 10, wherein a longitudinal axis of the cylinder assembly fitting portion is substantially coaxially aligned with a longitudinal axis of the first fuel conduit portion.

12. The cylinder assembly of claim 8, comprising a fuel rail connector carried by the second fuel conduit portion, the fuel rail connector configured to couple to the fuel source via a fuel line.

13. The cylinder assembly of claim 8, wherein the tab engaging portion comprises a first tooth and a second tooth spaced apart from the first tooth, the tab engaging portion configured to capture a tab extending from a body of the fuel injector between the first tooth and the second tooth to limit rotation of the fuel injector about the longitudinal axis of the fuel injector.

14. The cylinder assembly of claim 12, wherein the fuel line connector carried by the second fuel conduit portion is configured in one of a substantially T-shaped configuration and a substantially elbow shaped configuration.

15. The cylinder assembly of claim 12, wherein the fuel line connector carried by the second fuel conduit portion comprises a compliant fuel line conduit coupled thereto, the compliant fuel line conduit configured to absorb at lease a portion of a load generated by the cylinder assembly on the fuel line during operation.

16. A method for securing fuel injector to an aircraft engine cylinder assembly, comprising:

disposing a nozzle end of a fuel injector within a fuel manifold of a cylinder housing of a cylinder assembly;

disposing a fuel source end of the fuel injector within a first port of a first fuel conduit portion of a fuel injector mounting assembly;

securing a base of the fuel injector mounting assembly to the cylinder assembly;

disposing a substantially C-shaped body engaging portion of a securing mechanism about an outer perimeter of the fuel injector to secure the fuel injector to the base to limit axial translation of the fuel injector relative to a longitudinal axis of the fuel injector; and capturing a tab of the fuel injector by a tab engaging portion of the securing mechanism to limit rotation of the fuel injector about a longitudinal axis of the fuel injector.

17. The method of claim 16, comprising substantially coaxially aligning a longitudinal axis of the fuel manifold of the cylinder assembly, a longitudinal axis of the fuel injector, and a longitudinal axis of first portion of fuel injector mounting assembly.

18. The method of claim 16, comprising:

disposing a cylinder assembly fitting portion in fluid communication with the fuel manifold of the cylinder assembly; and disposing the nozzle end of the fuel injector within the cylinder assembly fitting portion.

19. The method of claim 16, comprising securing a fuel line connector to the second fuel conduit portion, the fuel line connector configured to couple to a fuel source via a fuel line.

20. An engine, comprising:

an engine body;

a network of fuel lines; and multiple cylinder assemblies supported by the engine body and coupled to the network of fuel lines, each cylinder assembly including (i) a cylinder housing, (ii) fuel injector mounting assembly coupled to the cylinder housing, (iii) a cylinder assembly fitting portion coupled to the cylinder housing, (iv) a fuel injector supported between the fuel injector mounting assembly and the cylinder assembly fitting portion, fuel injector including a nozzle end adjacent the cylinder assembly fitting portion and a fuel source end adjacent the fuel injector mounting assembly, and (v) a fuel line connector supported by the fuel injector mounting assembly, the fuel line connector being constructed and arranged to couple to a particular fuel line of the network of fuel lines.

* * * * *

UNITED STATES PATENT AND TRADEMARK OFFICE
CERTIFICATE OF CORRECTION

PATENT NO. : 7,802,560 B2
APPLICATION NO. : 12/104646
DATED : September 28, 2010
INVENTOR(S) : Forrest Ross Lysinger, Joseph Eric Parlow and Ron Behar It is certified that error appears in the above-identified patent and that said Letters Patent is hereby corrected as shown below:

Claim 7, Column 10, Lines 21-25, "The fuel injector mounting assembly of claim 4, wherein the fuel line connector carried by the second fuel conduit portion comprises a compliant fuel line conduit coupled thereto, the compliant fuel line conduit configured to absorb at lease a portion of a load generated by the cylinder assembly on the fuel line during operation" should read --The fuel injector mounting assembly of claim 4, wherein the fuel line connector carried by the second fuel conduit portion comprises a compliant fuel line conduit coupled thereto, the compliant fuel line conduit configured to absorb at least a portion of a load generated by the cylinder assembly on the fuel line during operation--.

Claim 15, Column 11, Lines 16-21, "The cylinder assembly of claim 12, wherein the fuel line connector carried by the second fuel conduit portion comprises a compliant fuel line conduit coupled thereto, the compliant fuel line conduit configured to absorb at lease a portion of a load generated by the cylinder assembly on the fuel line during operation" should read --The cylinder assembly of claim 12, wherein the fuel line connector carried by the second fuel conduit portion comprises a compliant fuel line conduit coupled thereto, the compliant fuel line conduit configured to absorb at least a portion of a load generated by the cylinder assembly on the fuel line during operation--.

Signed and Sealed this
Fourth Day of January, 2011

David J. Kappos
*Director of the United States Patent and Trademark Office*